Sept. 27, 1955  P. E. OHMART  2,718,786
GASEOUS THERMOCOUPLE TEMPERATURE MEASURING MEANS
Filed Nov. 2, 1951  2 Sheets-Sheet 1

INVENTOR.
Philip E. Ohmart.
BY
Wood, Herron & Evans.
ATTORNEYS.

Sept. 27, 1955　　　　　　P. E. OHMART　　　　　　2,718,786
GASEOUS THERMOCOUPLE TEMPERATURE MEASURING MEANS
Filed Nov. 2, 1951　　　　　　　　　　　　　　2 Sheets-Sheet 2

INVENTOR.
Philip E. Ohmart.
BY
Wood, Herron & Evans.
ATTORNEYS.

United States Patent Office 2,718,786
Patented Sept. 27, 1955

2,718,786

GASEOUS THERMOCOUPLE TEMPERATURE MEASURING MEANS

Philip E. Ohmart, Dayton, Ohio, assignor to The Ohmart Corporation, Cincinnati, Ohio, a corporation of Ohio Application November 2, 1951, Serial No. 254,507

15 Claims. (Cl. 73—359)

This invention relates to apparatus for indicating temperature by measuring an electric voltage, or controlling temperature by using such a voltage to govern a heat source. It is particularly directed to a device for generating an electric voltage which varies in accordance with temperature changes.

At present, the device most commonly used to generate an electrical current varying as a function of temperature is an ordinary thermocouple consisting of two dissimilar materials which are joined at two points, or junctions. One junction is maintained at a constant temperature, while the other, or "hot" junction, is subjected to the medium whose temperature condition is to be measured. A difference in potential is created whenever there is a difference in temperature between the two junctions, resulting in a current flow through a circuit in electrical connection between them.

The electrical circuit joining the two junctions may contain a sensitive instrument for measuring current flow, and, if properly calibrated, can indicate directly the temperature of the "hot" junction. On the other hand, if it is desired to control the temperature of the medium to which the "hot" junction is exposed, the current generated by the thermocouple can be compared with an opposite current of a magnitude corresponding to that produced by the thermocouple at the desired temperature, and the result of this comparison can be fed into a closed loop servo-system for controlling the source of heat. Thermocouples of this type are generally satisfactory where the temperature gradient is large, but the change in voltage caused by a small variance in temperature is not of sufficient magnitude to permit accurate indication or sufficiently close control for many operations.

In the United States patent application Serial No. 233,718, which was filed June 27, 1951, now U. S. Patent 2,696,564, December 7, 1954, I have disclosed a cell which is capable of producing an electric current when exposed to radioactive radiation. The cell consists essentially of two electrodes residing in spaced relation in a chamber containing an ionizable filling gas. Forcible ionization of the gas, as by exposure of the gas to radioactive radiation, causes flow of current in a circuit interconnecting the two electrodes of the cell.

The present invention briefly is predicated upon the discovery and determination that the open-circuit voltage produced by such a cell is related to the work functions of the cell electrodes and their temperatures. More specifically, I have determined that such a cell is capable, in fact, of producing voltage changes one hundred times greater in magnitude than the voltages produced by ordinary metal contact thermocouples when subjected to identical temperature variations. It is the purpose of the present invention to utilize this phenomena for indicating temperature changes, measuring temperatures or controlling temperatures as desired, with greater sensitivity or accuracy than is obtainable with the best of metal to metal contact thermocouples now available.

The cells of the present invention, utilized for temperature measuring or controlling purposes, may be designated gaseous thermocouples, and are adapted for use in the determination or control of a wide variety of temperature conditions prevailing in solid, fluid or gaseous mediums. Thus, for example, the temperature of a calender roll may be measured by placing a gaseous thermocouple near the roll for exposure to the heat radiating from it. The temperature of liquids in vats may be measured by means of a gaseous thermocouple, immersed within the liquid. Similarly, the gaseous thermocouple of the present invention may be used to measure temperature conditions in tanks, gas flues, steam boilers or steam lines, molten metal containers and the like, where thermocouples of conventional construction heretofore had been employed. The two electrodes of the gaseous thermocouple may be interconnected by an electric circuit which is suitable for measuring voltage with negligible current drain, and the current or potential existing in the circuit may be measured by instruments calibrated to read in terms of degrees, volts, or other variance, as desired. For control purposes, the current or potential generated by the gaseous thermocouple may be compared, in a closed loop circuit, with a current or voltage corresponding to a desired temperature, or to a reference temperature so that any difference prevailing between the two may be magnified and exerted to exercise a temperature control function.

More specifically, the discovery which has led to this invention constitutes a determination that open-circuit voltage developed by a cell of the type disclosed in the aforesaid pending patent application depends, at a given temperature, upon the difference in the apparent work functions of the metal or materials comprising the electrodes of the cell. The term "apparent work function" as used herein denotes the amount of energy required to free an electron from a surface at a given temperature. Secondly, the apparent work function of a material varies with its temperature; while the apparent work functions of some materials change very little over an appreciable temperature range, as in the case of carbon, the work functions of other materials such as zinc treated with nitric acid change appreciably with variations in temperature.

Therefore, in accordance with this invention, a highly sensitive, temperature responsive instrument may be provided either by the utilization, as electrodes, of materials whose work functions differ by an amount varying appreciably with change in temperature, or by the utilization of one electrode displaying a change in work function in respect to temperature change, and as a second electrode, a material having a substantially constant work function. The second electrode may be one in which the work function inherently remains constant, or nearly so, with respect to temperature, or the temperature of this electrode may be deliberately controlled so that its work function remains constant regardless of whatever propensity it may have to change in response to temperature variations.

In accordance with these principles, one typical type of gaseous thermocouple of the present invention comprises a cell containing an ionizable gas enveloping or in communication with spaced electrodes having work function characteristics which diverge with increase in temperature. If the electrodes are dissimilar, a certain difference of potential will exist at room temperature, due to the difference in the apparent work functions of the two electrodes at that temperature. When the temperature of both electrodes is then raised to a new temperature, the work functions of each of the materials will change, but in different amounts so that the difference between the two will be greater and a larger open-circuit voltage will be present at the increased temperature. Since the voltage developed is dependent upon the temperature of the electrodes, measurement of this voltage with a properly calibrated instrument provides an accurate measurement of the temperature. Obviously, the thermocouple can also be used to control temperature rather than measure it in a manner such as that pointed out above.

Another type of gaseous thermocouple of the present invention comprises means for maintaining one of the electrodes of the cell at a substantially constant temperature while the temperature of the other electrode is permitted to vary in accordance with the temperature condition to be measured. This modification provides a great change in potential or under certain conditions, current flow for any given temperature change, since the work function of only one of the materials is varying and, consequently, the rate of divergence is much higher.

A thermocouple of the latter type is particularly well adapted where extremely accurate measurements are required, as for use in measuring radiant heat where the temperature of the electrode is elevated to a lesser degree than that of the material being measured. It is also to be noted that in this embodiment both electrodes may be constructed of the same material, in which case the work function of the constant temperature electrode will remain the same and the current generated will be proportional to the change in the work function of the variable temperature electrode.

The invention is explained in detail in the following description of the drawings in which preferred embodiments of the invention are illustrated.

Generally, a gaseous thermocouple constructed in accordance with the present invention comprises a housing, forming an envelope for a filling gas, a source of radiant energy for ionizing the gas, and two electrodes which are placed within the housing and are separated from one another by the gas. A thermocouple of this type utilizes the phenomenon, described in my copending application in which ionization of the filling gas, by radiation from a radioactive or ultraviolet source, causes a current to flow between the electrodes in much the same manner as in a conventional battery with a liquid electrolyte.

Briefly, when the gas is ionized, there is a differential migration of the ions toward the electrodes, the positive ions moving toward one electrode, the electrons moving toward the other electrode. The positive ions move toward the electrode constituted by the material having the higher work function and the electrons move toward the electrode having the lower work function. As a result, the electrode having the higher work function is driven to a positive potential with respect to the electrode having the lower work function.

Figure 1:
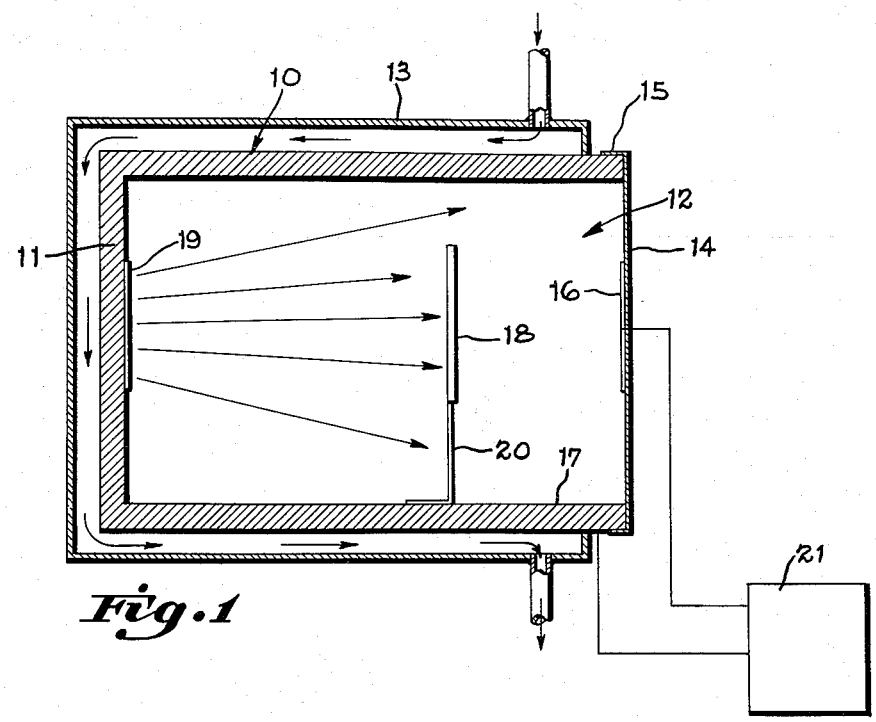
Figure 1 is a diagrammatic view of one embodiment of a gaseous thermocouple constructed in accordance with the present invention.

In the embodiment shown diagrammatically in Figure 1, a gaseous thermocouple includes a generally cylindrical shell or casing 10, having a closed end 11, and an open end 12. In this embodiment, the casing is preferably relatively massive and of substantial heat capacity so that it is resistant to temperature change. Additionally, cooling means such as a water jacket 13, or if preferred, a surrounding container filled with Dry Ice may be provided to stablize the temperature of the shell at a constant level. The open end of the casing is closed by means of a thin nonconductive diaphragm 14 constructed of suitable material, such as a plastic resin or mica, and sealed about the periphery of the casing as at 15 by any suitable means. In order to avoid spurious variations in current due to changes in the pressure or composition of the filling gas, it is requisite that the diaphragm be impervious to gas flow and that it be sealed in a gas-tight relationship to the shell. The diaphragm should be a relatively good conductor of heat if rapid response is desired. However, for maximum sensitivity to low levels of heat energy the diaphragm is preferably constructed from a material which is a poor heat conductor.

One electrode 16 is disposed adjacent the inner surface of the diaphragm 14. This electrode is preferably constructed of a thin material having low heat capacity so that its temperature will be accurately and rapidly responsive to changes in the temperature of the medium being measured. One type of electrode which will work very satisfactorily is constituted by a thin layer of lead, aluminum or other electrode material which may be plated or evaporated on diaphragm 14. It is further desirable that the electrode 16 be black in color so that it will be more readily absorptive of heat radiation. One method of producing such an electrode is by evaporation of a thin film of metal or metallic oxide on the inner surface of a thin plastic or mica sheet diaphragm. The shape of the electrode may be determined by the use of a template during evaporation.

The second electrode 17 may be of any suitable construction and in the embodiment shown is constituted either by the casing material itself or by an electrode material coated on the interior of the casing. For example, the second electrode may comprise an aquadag (colloidal graphite) coating or a metal or metallic oxide deposited on the inner casing surface.

The filling gas used in the thermocouple may be of any suitable composition, the particular gas used resulting in different values of efficiency under otherwise similar conditions. Examples of a suitable gas for this purpose are argon, helium, nitrogen and carbon dioxide, the monatomic gases being preferred for several reasons, among them being the fact that their use leads to greater stability and life.

Means are provided for producing radiations to ionize the filling gas within the thermocouple. Such means may comprise a source of radioactivity, 19, disposed within the cell, and preferably placed remotely from the first, or temperature responsive electrode 16. The source of radiation may be an emitter of alpha or beta particles, gamma rays, X-rays, neutrons or ultra violet light or any other type of radiation effective to ionize a gas. Preferably, however, materials are used which do not emit gamma rays, or other rays dangerous to personnel using the device. A suitable example of such a source is a beta emitter such as carbon-14, or strontium-90. From the standpoint of half-life, carbon-14 having a half-life of about 5,000 years is desirable but is more expensive than the strontium-90, which has a half-life of about 30 years. Alpha emitting materials may also be used, although the holddown material to prevent them from migrating is thinner than in the case of the beta emitter, and hence, there would be more chance of migration of actvity within the cell. Also, there is some possibility that the alpha particles striking the outer electrode might cause molecular structural changes in the electrode surface resulting in a slow drift of the normal open circuit voltage, and hence, a beta emitter is usually preferred.

In order to reduce noise, or stray currents, in the measuring or control circuit, a baffle absorbing medium is preferably provided to prevent the radiation from falling directly upon the first electrode 16. This may be conveniently provided by means of a shield 18, mounted within the shell as by support 20, and disposed in such relation to the source of radiation 19 that the direct rays thereof will not strike the first electrode 16. It will be noted that this baffle does not interfere with the normal operation of the thermocouple, since that portion of the gas within the casing which is ionized by radiation will tend to diffuse throughout the cell and the generative phenomenon discussed above will occur as if there were no baffle present.

In order to measure the voltage produced by the thermocouple, a measuring instrument 21 is placed in electrical circuit connection between the electrodes 16, 17. This measuring device may comprise any suitable instrument for measuring voltage requiring only a small, or no current flow in the measuring circuit. One device of this type is an electron voltmeter by means of which the substantially open circuit potential between the electrodes can be measured. Another suitable instrument for measuring the open circuit potential includes a source of voltage and potentiometers connected across the electrodes in such a manner that the potentials of the battery and of the thermocouple are opposed. By adjusting the potentiometer until the current flow in the circuit is zero, the open circuit voltage of the cell may be measured across the potentiometer. By suitably calibrating either type of voltage measuring instrument, the temperature of the medium to which the temperature sensitive electrode is exposed can be read directly in degrees.

Experiments have been made with a cell constructed generally in accordance with Figure 1, in which the constant temperature electrode was constituted by carbon and the temperature responsive electrode was formed from zinc treated by washing with dilute nitric acid. The filling gas, air, was ionized by gamma rays produced from 4 millicuries of cobalt-60. With both electrodes at substantially room temperature, the difference of potential across the electrodes was 580 millivolts. After the temperature of the lead electrode had been raised 50° C. this potential was increased to 780 millivolts. The potential-temperature relationship was found to be substantially linear so that the 200 millivolt change over a 50° C. temperature rise represents a change of approximately 4 millivolts per degree. This is approximately 80 times the change in potential across an ordinary thermocouple caused by a one degree temperature rise. A change in temperature of approximately .00025° C. will produce a change of open circuit voltage in this thermocouple of approximately 10 times the magnitude of Johnson noise in the circuit, which is generally considered a limiting factor in potential measurement. Thus, even such an extremely minute change in temperature as this can be readily observed by measuring the change in potential across a gaseous thermocouple with a suitable sensitive instrument.

Figure 2:
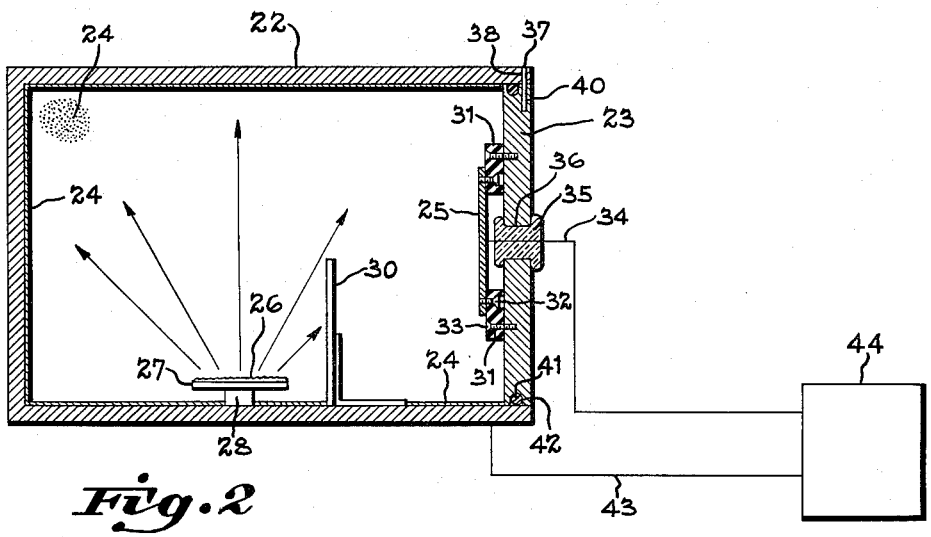
Figure 2 is a similar view of a modified form of the device.

Figure 2 discloses a modification of the thermocouple shown in Figure 1. In this modification the cylindrical housing 22 is closed by means of a cover 23 rather than a diaphragm. In this modification, the casing 22 and cover 23 may be of substantially the same heat capacity, since it is intended that the temperature of both electrodes will be varied in response to the temperature condition being measured. In this embodiment, one electrode 24 is constituted by a coating, such as aquadag or a metallic oxide, on the inside of the casing 22. The second electrode 25 is constituted by a plate which is carried by the cover 23. A source of radiation is provided within the housing as by a quantity of radioactive material 26, electroplated upon a base strip 27, which is, in turn, mounted on bracket 28. As in the preferred embodiment a shield 30 is provided intermediate the radioactive source 26, and the plate electrode 25, to prevent direct rays from striking that electrode.

The plate 25 may be secured to the cover 23 in any suitable manner; for example, it may be mounted on Teflon insulators 31—31 by means of bolts 32, and the Teflon insulators may, in turn, be secured to the cover 23 as by bolts 33. Electrical connection is made to the plate 25 by wire 34 which passes through an insulator 35 inserted in opening 36 in the cover. I have found that glass to Kovar seals as insulators are well suited for this purpose, providing good electrical insulation and gas-tight seal. The cover 23 is secured in place by means of pins 37 which are passed through corresponding openings 38, 40, in the shell 22 and in the cover 23. A gas-tight seal is provided between the shell and cover by means of an O ring 41 residing in an annular groove 42 in the cover, and pressing against the shell wall. As before, the electrodes 24 and 25 are connected by lead-in wires 34 and 43 to a suitable instrument 44 for measuring the voltage or to a network for comparing the voltage developed by the cell with a standard voltage for use in controlling temperature.

Figure 3:
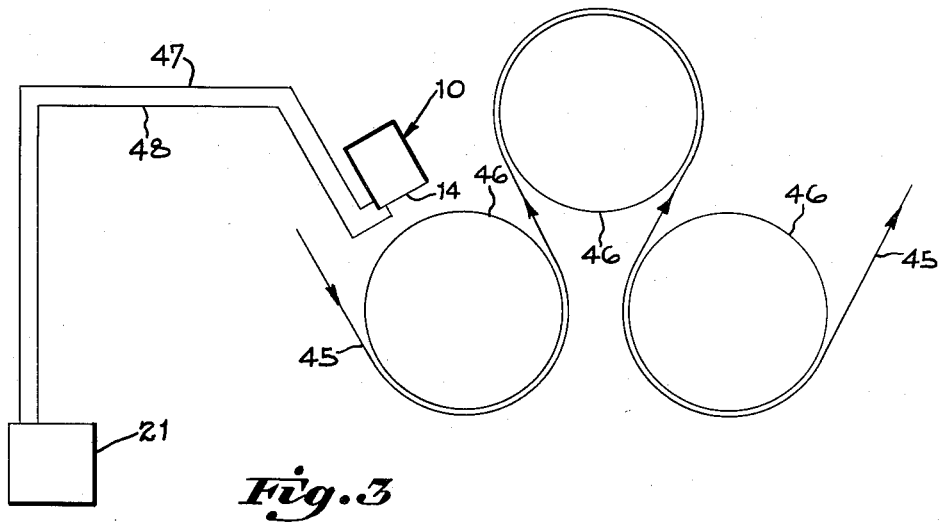
Figure 3 is a diagrammatic view of a thermocouple installed for measurement of the temperature of a calender roll.

One typical installation of my thermocouple is shown diagrammatically in Figure 3. In this installation, a gaseous thermocouple is used to measure the temperature of a calender roll of the type employed in paper making. A web of paper 45 is shown passing over the rolls 46. A gaseous thermocouple 10 preferably of the type shown in Figure 1 is disposed adjacent one of the rolls with the diaphragm 14 directed toward the roll. The electrodes are connected by wires 47, 48, to a measuring device indicated at 21. The temperature of the roll 46 is measured by its radiant, or black body heat, which raises the temperature of the electrode associated with the diaphragm, while the other electrode is held at a substantially constant temperature. The type of cell indicated in Figure 1 is preferred for this kind of measurement, since only one of the electrodes is temperature responsive, and it is constituted by a member of low heat capacity so that its temperature can be controlled by the relatively small quantities of heat radiated from roll 46.

Figure 4:
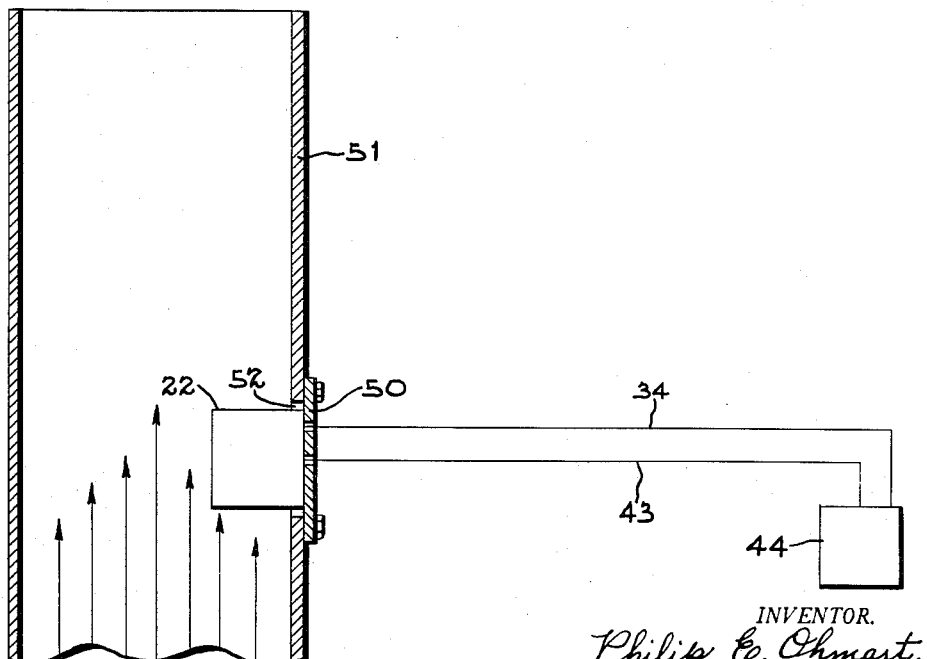
Figure 4 is a view showing a gaseous thermocouple installed in a flue for measuring the temperature of exhaust gases.

A second application of a gaseous thermocouple is shown in Figure 4 in which the temperature of exhaust flue gases is being measured. As shown diagrammatically, a thermocouple 22 of the type shown in Figure 2 is mounted upon a plate 50 which is, in turn, bolted to a stack 51 in such a manner that the cell 22 extends into the interior of the stack through an aperture 52 provided therein. The passage of the flue gases around the thermocouple 22 is effective to raise the temperature of the electrodes to substantially that of the gases. As the temperature of the electrodes is varied, the potential developed by the thermocouple changes. By connecting the electrodes through wires 34 and 43 to a suitable measuring device 44, the temperature of the flue gases may be determined.

Having described my invention, I claim:

1. A temperature measuring apparatus comprising a first electrode adapted to maintain a substantially constant temperature, a second electrode electrochemically dissimilar to said first electrode and responsive to the variable temperature condition to be measured, said second electrode being formed of material having an apparent work function which varies substantially with temperature, a casing enclosing said electrodes in spaced relation and containing an ionizable gas, means for producing radiations in said gas, said radiations being effective to ionize said gas, whereby an electrical difference of potential between said electrodes is created varying in relation to the difference in temperature of said electrodes, and means for measuring said difference.

2. A temperature responsive apparatus comprising a first electrode of relatively large heat capacity adapted to maintain a substantially constant temperature, a second electrode electrochemically dissimilar to said first electrode and of relatively low heat capacity, said second electrode being readily responsive to temperature variation, said second electrode being formed of material having an apparent work function which varies substantially with temperature, a casing enclosing said electrodes in spaced relation and containing an ionizable gas, means for producing radioactive radiations in said gas to ionize said gas and thereby generate directly an electrical difference of potential between said electrodes varying in relation to the difference in temperature of said electrodes, and means responsive to said difference of potential.

3. A temperature measuring apparatus comprising a first electrode, a second electrode electrochemically dissimilar to said first electrode, at least one of said electrodes being responsive to variations in temperature, and being formed of a material having an apparent work function which varies substantially with temperature, a casing enclosing said electrodes in spaced relation and containing an ionizable gas, means for ionizing said gas, whereby an electrical difference of potential is developed between said electrodes varying in accordance with the temperature to be measured, and means for measuring said difference of potential for determining said temperature.

4. Temperature responsive apparatus comprising a first electrode, a second electrode electrochemically dissimilar to said first electrode, at least one of said electrodes being responsive to the variable temperature condition to be measured, and being formed of a material having an apparent work function which varies substantially with temperature, a casing enclosing said electrodes in spaced relation and containing an ionizable gas, means for producing radioactive radiations in said gas whereby said gas is ionized and an electrical difference of potential is developed between said electrodes, said potential varying in relation to the said temperature condition and means responsive to said difference of potential.

5. Apparatus for measuring temperature comprising a casing at least two electrodes mounted within said casing, said electrodes being separated by an ionizable gas, one of said electrodes being maintained at substantially constant temperature, the temperature of the other said electrode varying with the temperature to be measured, said second named electrode being formed of a material having an apparent work function which varies substantially with temperature, means for producing radioactive radiation in the gas, said radiation being effective to ionize said gas with resultant generation of an electric current whereby a potential variable in amount as a function of the temperature difference of said electrodes may be measured and means for measuring said potential as a measure of the temperature to be determined.

6. A temperature measuring device comprising a casing having a wall and an open end, said wall constituting a substantially constant temperature electrode, a diaphragm closing said open end and confining an ionizable gas in said casing, a second electrode on the inner wall of said diaphragm, said second electrode being of low heat capacity, and being separated from said cell wall by said gas, said second named electrode being formed of a material having an apparent work function which varies substantially with temperature, means for producing radioactive radiations in the gas, said radiations being effective to ionize the gas and thereby cause a potential difference to be established between said electrodes, and means responsive to the potential difference generated between said electrodes as a measure of the temperature difference therebetween.

7. Temperature control apparatus comprising a constant temperature electrode a second electrode being adapted to vary in temperature as the temperature condition to be measured, said second electrode having an apparent work function variable in accordance with the temperature of said electrode, an ionizable gas separating said electrodes, means for producing radioactive radiations in said gas, said radiations being effective to ionize said gas with resultant development of a potential difference between said electrodes varying with the difference of temperature thereof, and control means responsive to said potential difference.

8. A gaseous thermocouple for generating a potential difference varying in response to variations in temperature comprising a casing forming a gas-tight envelope and containing an ionizable gas therein, means for ionizing said gas, electrodes in communication with said gas and in electrical circuit connection with each other, the temperature of at least one of said electrodes varying in accordance with the temperature to be measured, variable temperature electrode being formed of a material having an apparent work function which varies substantially with temperature, the difference between the apparent work function of each of the electrodes, being a function of the temperature to be measured and providing a current flow in the circuit between the electrodes.

9. A gaseous thermocouple for generating a potential difference varying in response to variations in temperature comprising, a cell having a gas-tight envelope containing an ionizable gas therein, means for ionizing said gas, electrodes in communication with said gas and in electrical circuit connection with each other, means for maintaining one of said electrodes at substantially constant temperature, the temperature of the other of said electrodes varying in accordance with the temperature to be measured, the variable temperature electrode being formed of a material having an apparent work function which varies substantially with temperature.

10. A gaseous thermocouple for generating a potential difference varying in response to variations in temperature comprising, a cell having a gas-tight envelope containing an ionizable gas therein, means for ionizing said gas, a first electrode and a second electrode in communication with said gas and in electrical circuit connection with each other, said second electrode being electrochemically dissimilar to said first electrode, one of said electrodes being formed of a material having an apparent work function which varies substantially with temperature, the difference between the work functions of the two electrodes varying with the temperature to be measured, whereby a potential is developed in the circuit between said electrodes which is a function of said temperature.

11. A gaseous thermocouple for generating a potential difference varying in response to variations in temperature comprising a cell having a gas-tight envelope containing an ionizable gas therein, means for ionizing said gas, electrodes in communication with said gas and in electrical circuit connection with each other, at least one of said electrodes being formed of a material having an apparent work function which varies substantially with temperature, the relationship between the work functions of the electrodes and the temperature to which they are exposed being such that a potential is produced in the circuit between the electrodes which is a function of the temperature to be measured.

12. Temperature responsive apparatus comprising a casing having an open end, means associated with said casing constituting a substantially constant temperature electrode, a diaphragm closing the open end of said casing and confining a gas therein, said diaphragm being relatively thin and of low heat capacity, a second electrode of low heat capacity on the inner wall of said diaphragm and adapted to respond readily to the surrounding temperature, said second electrode being formed of a material having an apparent work function which varies substantially with temperature, and means for ionizing the gas within said cell between said electrodes by radioactive radiations with resultant generation of a potential difference between said electrodes variable in relation to the temperature difference thereof.

13. Temperature responsive apparatus comprising a casing closed to the passage of gas therethrough, means within said casing constituting a substantially constant temperature electrode, a second electrode of low heat capacity within said cell and adapted to change readily in temperature, said second electrode being formed of a material having an apparent work function which varies substantially with temperature, an ionizable gas within said cell separating said electrodes, and means for ionizing the gas within said cell between said electrodes by radioactive radiations with resultant generation of a potential difference between said electrodes variable in relation to the temperature difference thereof.

14. Temperature responsive apparatus comprising a cell closed to the passage of gas therethrough, means within said cell constituting a substantially constant temperature electrode, a second electrode of low heat capacity within said cell and adapted to change readily in temperature, said second electrode being formed of a material having an apparent work function which varies substantially with temperature, an ionizable filling gas within said cell separating said electrodes, a source of radioactive material disposed within said cell for ionizing said filling gas with resultant generation of a potential difference between said electrodes variable in relation to the temperature difference thereof, and means disposed intermediate said source of radioactive material and said second electrode for restricting direct radiation from said source to said second electrode.

15. A temperature responsive device for generating a potential difference varying in response to variations in temperature comprising a cell having a first and a second electrode therein, means for closing said cell to retain a gaseous medium therein said gaseous medium being in contact with each of said electrodes, at least one of said electrodes being readily subject to changing temperature conditions, and being formed of a material having an apparent work function which varies substantially with temperature, and a radioactive source for producing ionization of the gas within said cell, to cause said ionized gas to act as an electrolyte with generation of an electric potential difference between said electrodes determined in relation to the difference in the work function of the two electrodes, and means for restricting direct radiation from said source to at least one of said electrodes.

References Cited in the file of this patent

UNITED STATES PATENTS

| | | |
|---|---|---|
| 1,523,013 | Greenslade | Jan. 13, 1925 |
| 2,510,397 | Hansell | June 6, 1950 |
| 2,574,632 | Engelkemeir et al. | Nov. 13, 1951 |
| 2,634,609 | Obermaier | Apr. 14, 1953 |

FOREIGN PATENTS

| | | |
|---|---|---|
| 468,151 | Germany | Nov. 7, 1928 |

OTHER REFERENCES

The Electrician, October 31, 1924, p. 497.